United States Patent [19]

Kardach et al.

[11] Patent Number: 5,446,906
[45] Date of Patent: Aug. 29, 1995

[54] METHOD AND APPARATUS FOR SUSPENDING AND RESUMING A KEYBOARD CONTROLLER

[75] Inventors: James P. Kardach, San Jose, Calif.; Jayesh M. Joshi, Boca Raton, Fla.; Patrick M. Bland, Del Rey Beach, Fla.; Grant L. Clarke, Jr., Boca Raton, Fla.

[73] Assignee: Intel Corporation, Santa Clara, Calif.

[21] Appl. No.: 85,647

[22] Filed: Jun. 30, 1993

[51] Int. Cl.⁶ .............................................. G06F 1/32
[52] U.S. Cl. .................... 395/750; 364/273.1; 364/948.8; 364/948.7; 364/DIG. 2; 364/DIG. 1; 395/700
[58] Field of Search ............... 395/275, 575, 700, 750

[56] References Cited

U.S. PATENT DOCUMENTS

| | | | |
|---|---|---|---|
| 4,317,181 | 2/1982 | Teza et al. ........................... | 364/707 |
| 4,980,836 | 12/1990 | Carter et al. ........................ | 364/483 |
| 5,021,983 | 6/1991 | Nguyen et al. ...................... | 364/707 |
| 5,218,704 | 6/1993 | Watts, Jr. et al. ................... | 395/750 |
| 5,230,055 | 7/1993 | Katz et al. ........................... | 395/750 |
| 5,241,680 | 8/1993 | Cole et al. ........................... | 395/750 |
| 5,276,890 | 1/1994 | Arai .................................... | 395/750 |
| 5,283,906 | 2/1994 | Chen ................................... | 395/750 |
| 5,311,441 | 5/1994 | Tayama et al. ...................... | 364/483 |

Primary Examiner—Ken S. Kim
Attorney, Agent, or Firm—Blakely, Sokoloff, Taylor & Zafman

[57] ABSTRACT

A method and mechanism for suspending and resuming a keyboard controller. The present invention includes a method and mechanism for saving the state of an input device, such as a keyboard and/or mouse, such that the power to those devices may be removed. The keyboard controller of the present invention is capable of performing a password security function. The present invention allows the keyboard controller to be suspended and resumed without jeopardizing the password security function.

15 Claims, 4 Drawing Sheets

METHOD AND APPARATUS FOR SUSPENDING AND RESUMING A KEYBOARD CONTROLLER

FIELD OF THE INVENTION

This invention relates to the field of computer architecture; particular, the present invention relates to placing a computer system including a keyboard controller, in and out of a suspended state.

BACKGROUND OF THE INVENTION

Reducing power consumption is an important issue in many modern personal computers. This issue is particular important for battery-powered lap-top or notebook style portable computers. Furthermore, other computers with a limited supply of power also need to be designed with a concern for power conservation. Computers with a limited supply of power are often those designed to be portable. In order to achieve the portability of these computer systems, the power consumed by the system components must be reduced or minimized. By reducing power consumption, the battery life is prolonged. Clearly, the simplest way to conserve power is to shut the system down entirely; however, when the system is shutdown completely, the current state of the system is lost, thereby forcing the computer to restart (i.e., re-boot) from nothing but its system reset code. A better approach would be to provide a reduced level of power to vital subsystems, thereby saving the processing state of the computer without having to completely restart the computer from reset.

Some computer systems utilize suspend and resume conditions to enter a very low power state. In the suspend state, a lap-top is able to retain its machine or processing state for long periods of time (on the order of weeks and months). When the operator wants to use the computer again, this processing state is returned to the machine, such that the operator is returned to the state in which the computer was left. In this manner, the process of suspending a computer system comprises saving the state of machine, while the process of resuming comprises restoring the state of computer.

One problem of suspending and resuming a computer system is attributable to the current design of the keyboard/mouse controller. In a majority of systems, the keyboard/mouse controller performs many functions. For instance, the keyboard/mouse controller is responsible for passing scan codes between the keyboard and the operating system. In some computer systems, the keyboard/mouse controller also passes mouse information between the mouse and the operating system. The keyboard/mouse controller is also responsible for storing the state of the keyboard and the state of the mouse.

The keyboard/mouse controller also is responsible for performing the function of password security for a computer system. The keyboard/mouse controller performs the function of password security in response to a command from the processor of the computer system. When a keyboard/mouse controller receives a password security command, all commands sent to it from the processor are ignored until the keyboard/mouse controller detects the correct password being input using the keyboard. The password is normally typed in by the user. When the system receives a command to suspend, and the power is going to be removed from the keyboard and mouse, their states will be lost, such that the keyboard and mouse cannot return to their pre-suspended states upon exiting from the suspended state. However, if the keyboard/mouse controller is in the password security mode, it will ignore any command from the processor. This prevents the system from shutting off the power to the keyboard and mouse because during the resume process the state of these devices would otherwise be unknown and the keyboard and mouse could not be returned to their original state.

The present invention allows the mouse/keyboard controller to save the state of the keyboard and mouse without violating the security of the system. This invention provides two commands which in essence tell the keyboard/mouse controller to save the state of the keyboard and the mouse in a memory and restore the state of the keyboard and the mouse from a memory. Because the mouse/keyboard controller does not give information or perform any other function than saving or restoring the state of the keyboard or mouse, the security of the system is maintained.

SUMMARY OF THE INVENTION

A method and apparatus for suspending and resuming a keyboard controller is described. The present invention includes a computer system having a processor and at least one memory. The computer system also includes an input device capable of inputting command selections to the processor. A controller in the computer system prevents the command selections from being received by the processor until at least one predetermined input is received from the input device when the computer system is in a security mode. The computer system includes a device for generating a suspend signal to cause the computer system to enter the suspended state and another device for generating a resume signal to cause the computer system to exit the suspended state back into the fully functional state. A mechanism is included in the computer system to save the state of the input device in response to the suspend signal. Another mechanism disables the power to the input device after the state of the input device is saved.

The computer system also includes a mechanism for enabling the power to the input device in response to the resume signal. Another mechanism in the computer system restores the state of the input device from memory in response to the resume signal after the input device has been fully powered, such that the computer system returns to the security mode when the computer system was in the security mode upon entering the power suspend mode.

BRIEF DESCRIPTION OF THE DRAWINGS

The present invention will be understood more fully from the detailed description given below and from the accompanying drawings of the preferred embodiments of the invention, which, however, should not be taken to limit the invention to the specific embodiments, but are for explanation and understanding only.

DETAILED DESCRIPTION OF THE PRESENT INVENTION

A method and apparatus for suspending and resuming a keyboard controller is described. In the following detailed description of the present invention numerous specific details are set forth in order to provide a thorough understanding of the present invention. However, it will be obvious to one skilled in the art that the present invention may be practiced without these specific details. In other instances well-known methods, functions, components and procedures have not been described in detail as not to unnecessarily obscure the present invention.

In the following description, for purposes of explanation and not limitation, specific register structures, mappings, bit assignments, etc. are set forth in order to provide a thorough understanding of the present invention. However, it will be apparent to one skilled in the art that the present invention may be practiced in other embodiments that depart from these specific details. In other instances, detailed descriptions of well-known aspects of microprocessor systems are omitted so as to not obscure the description of the present invention with unnecessary detail.

Overview of One Embodiment of the Computer System

The present invention is advantageously employed in a microprocessor design optimized for applications requiring low power consumption and compact size. Such applications particularly include small battery-powered personal computers of the types commonly referred to as laptops and notebooks. One preferred embodiment of such a microprocessor is briefly described below; however, it is to be understood that the present invention is not limited to this particular microprocessor design, and may be incorporated in virtually any processor design.

Figure 1:
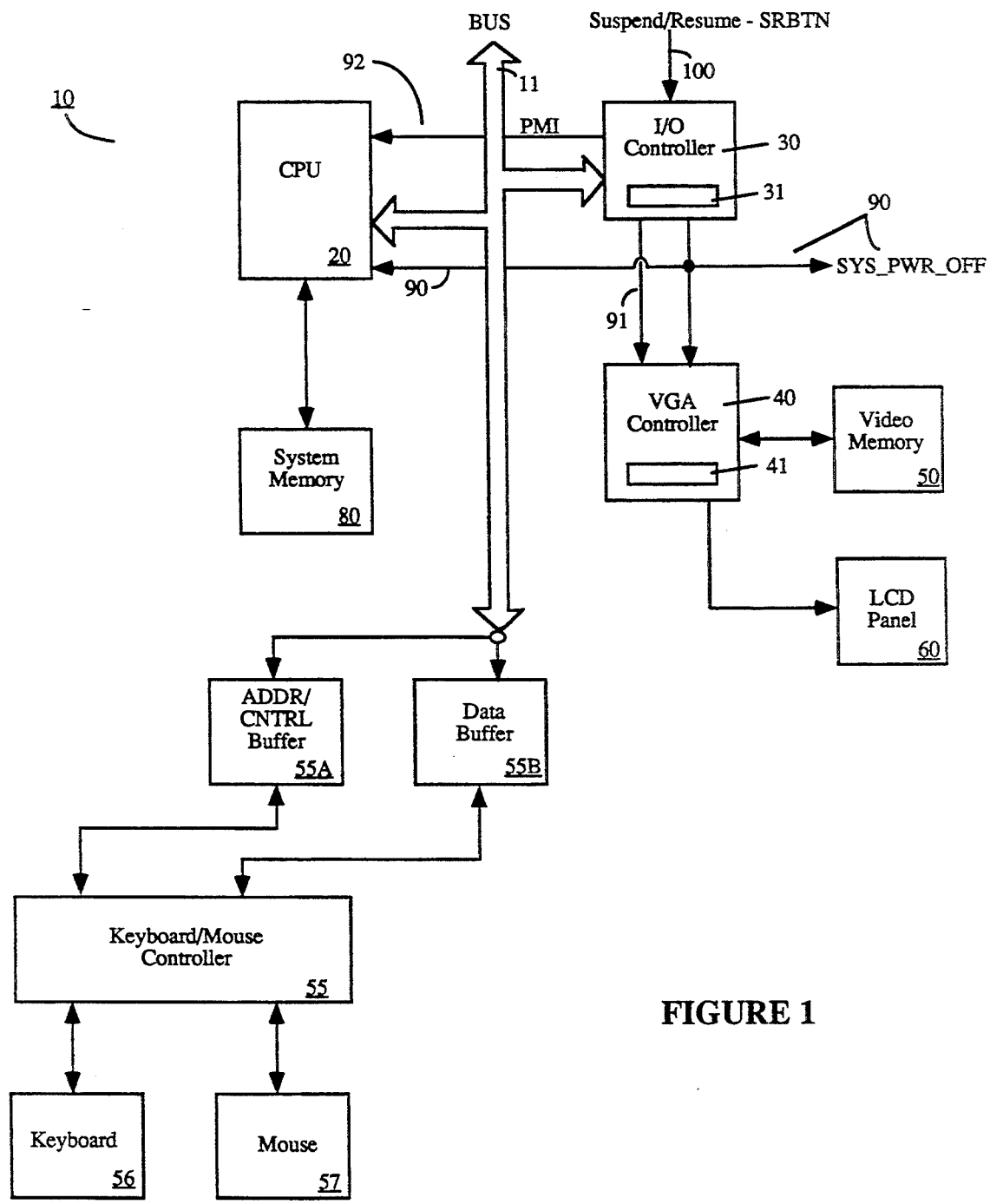
FIG. 1 is a block diagram of the embodiment of the computer system of the present invention.

Referring to FIG. 1, a preferred embodiment of the computer system 10 of the present invention is shown. In the preferred embodiment, computer system 10 includes an i86SL TM brand microprocessor manufactured by Intel Corporation, the corporate assignee of this invention. Such a computer system is compatible with the IBM TM PC AT Personal Computer. System 10 comprises three main processor components, designated as Central Processing Unit (CPU) 20, I/O controller 30 and VGA controller 40. In one embodiment, CPU 20 is an expanded central processing unit including a CPU, a memory controller, a cache controller, bus control logic and line buffers. A system memory 80 is coupled to CPU 20. In one embodiment, system memory 80 substantially comprises dynamic random access memory (DRAM) devices.

I/O controller 30 is a single chip input/output (I/O) unit comprising parallel ports, dual serial ports, a real time clock unit, dual programmable interrupt controllers, dual programmable timers, dual DMA controllers and a memory mapper. I/O controller 30 also contains a register 31 denoted the IO_SUSPEND register 31. Register 31 is used to command I/O controller 30 to transition to the suspend mode. A bit in this register, IO_SUSPEND, is asserted by CPU 20 when suspend mode is requested. In addition, a suspend/resume signal 100 is received by I/O controller 30. The suspend/resume signal 100 is used to request the power suspend mode on the occurrence of a hardware event. Such a hardware event may be a battery low condition, the expiration of a time-out timer, or the activation of a suspend/resume button on the computer case. For example, the action of opening or closing a lid on the computer case may activate the suspend/resume button.

In a suspend mode, I/O controller 30 provides a SYS_PWR_OFF signal 90 to system 10. The SYS_PWR_OFF signal 90 indicates that system 10 has transitioned to a power suspend mode. In response to the SYS_PWR_OFF signal 90, other subsystems shut down non-vital components in order to conserve power, including keyboard 56 and mouse 57. The details of the operation of these and other signals during suspend mode is described below.

VGA controller 40 is a single chip graphics interface comprising a VGA graphics controller and a video memory controller. A flat panel display unit 60 is coupled to VGA controller 40 to display graphics/video data and information. A video memory 50 is also coupled to VGA controller 40 for storing video data and information. In one embodiment, video memory 50 substantially comprises DRAM devices. VGA controller 40 also contains a register 41 denoted the VGA_SUSPEND register 41. This register is used to command VGA controller 40 to transition to the suspend or resume mode. A bit in this register, VGA_SUSPEND, is asserted by CPU 20 when suspend mode is requested. In the preferred embodiment, the IO_SUSPEND register 31 in I/O controller and the VGA_SUSPEND register 41 in VGA controller 40 are actually the same register. One register is a shadow of the other. In an alternative embodiment, there may be two separate registers, one in I/O controller 30 and the other in VGA controller 40. In either case, however, the two control bits in the registers 31 and 41, IO_SUSPEND and VGA_SUSPEND, are distinct and separate control bits. IO_SUSPEND is associated only with I/O controller 30; VGA_SUSPEND is associated only with VGA controller 40. I/O controller 30 is able to sense when IO_SUSPEND transitions to an active or inactive state. VGA controller 40 is able to sense when VGA_SUSPEND transitions to an active or inactive state.

A keyboard controller 55 is also coupled to bus 11 of the computer system via address/control buffers 55A and data buffers 55B. Buffers 55A buffer address and control signals between bus 11 and a command port of keyboard controller 55. Buffers 55B buffer data between bus 11 and a data port of keyboard controller 55. In the currently preferred embodiment, each of buffers 55A and 55B are coupled to two 8-bit ports of keyboard controller 55. Keyboard controller 55 is also coupled to keyboard 56 and mouse 57 and acts as their interface to the remainder of the computer system. Keyboard controller 55 is coupled to keyboard 56 through a 4-bit microcontroller (not shown to avoid obscuring the present invention). The 4-bit microcontroller is coupled to keyboard controller 55 by a clocked data bus. When a key is pressed on the keyboard 56, the microcontroller interprets the scan code and sends it over the clocked data bus to keyboard controller 55 which uses the parallel interface (e.g., the two 8-bit ports) to send the inputted key strokes to CPU 20. Mouse 57 is coupled directly to controller 55 and provides cursor control. As the mouse 57 is moved, the movement is sent to keyboard controller 55.

In the present invention, keyboard controller 55 is capable of implementing a password security function for system 10. Keyboard controller 55 enters a password security mode in response to a command from CPU 20 in a manner well-known in the art. When keyboard controller 55 receives a password security command, it ignores all commands sent to it on bus 11 until it detects the correct password being transferred to it by the keyboard. In other words, the computer system 10 cannot be utilized until the correct password is typed in.

All of the subsystems communicate with one another and with other system components (such as expansion slots, disk controllers, etc.) via bus 11. In the preferred embodiment, bus 11 is an AT compatible bus. This type of bus is well known in the art.

Power Management within the Computer System

In the preferred embodiment, one function implemented by the present invention is a suspend/resume function. Suspend/resume comprises a process wherein an internal or external event indicates to the computer system that it will be inactive for some extended period of time. For example, such an event may comprise an operator's action of closing the computer case or lid or it may comprise the expiration of an event timer. In response to the detected event, the computer selectively powers down to a low power consumption mode (i.e. power suspend mode). In response to a second event, such as the operator's opening of the computer case or lid, the computer system is automatically restored to the application program running at the time that the first event was detected.

Although the power management function is particularly useful for conserving power in a battery-powered computer system, it also has applications in desktop systems where power conservation is not a primary concern. In this regard, the process of bringing up and shutting down an operating system is often lengthy. The present invention allows an operator to turn "off" a computer system without shutting down the operating system. Likewise, the operator can turn the computer system "on" without having to go through the initialization process of the operating system.

In a variation of the suspend/resume function, a standby mode may be entered when the computer system is on but has remained idle for some predetermined period of time. When time-out occurs, an instruction or interrupt is invoked placing the system in a reduced power consumption mode. In response to an event, such as an operator action, the system is restored to the operating mode by the resume procedure.

Operation During Suspend Mode

Figure 2A:
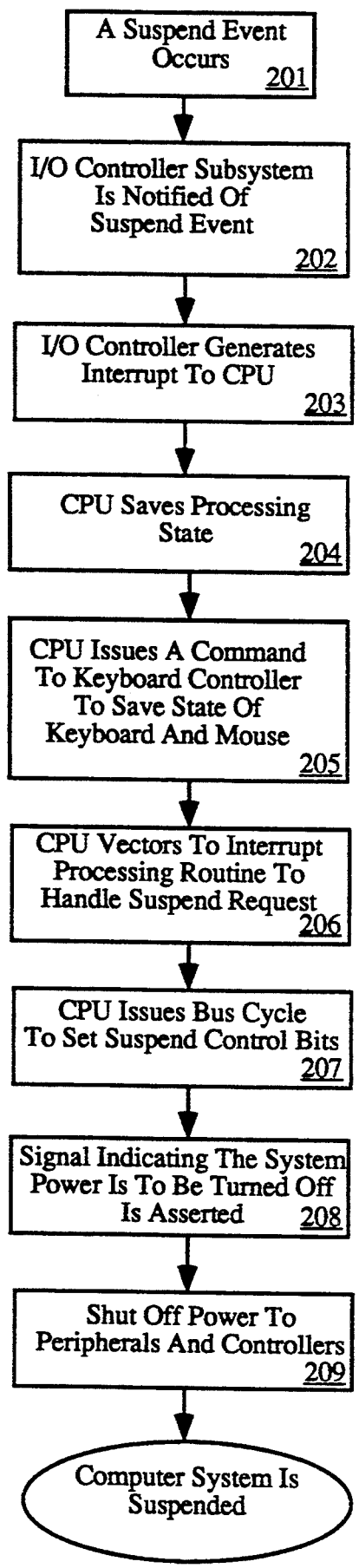
FIGS. 2A and 2B together illustrate the suspending and resuming processes respectively of the present invention.
Figure 2B:
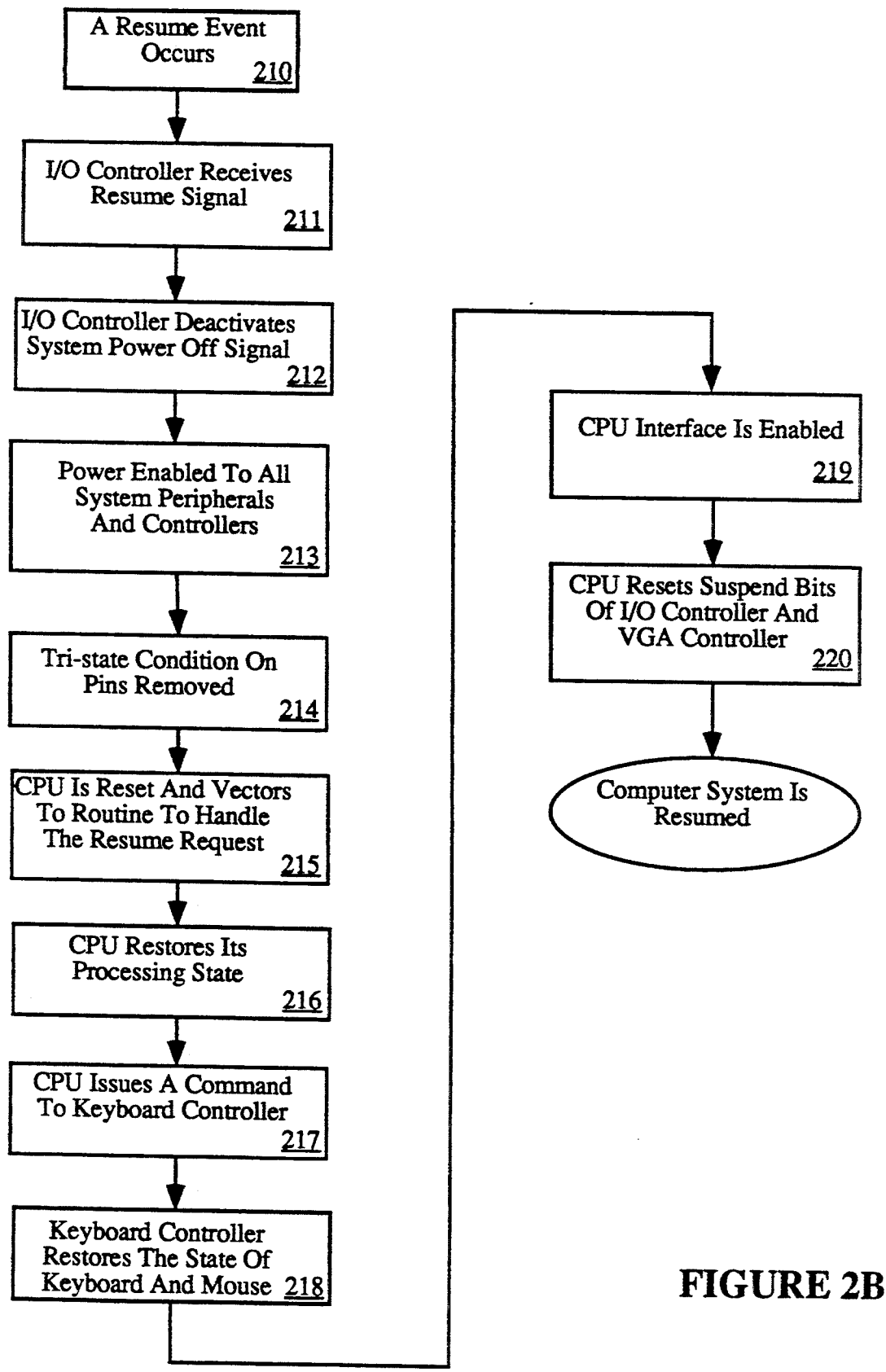
Figure 3:
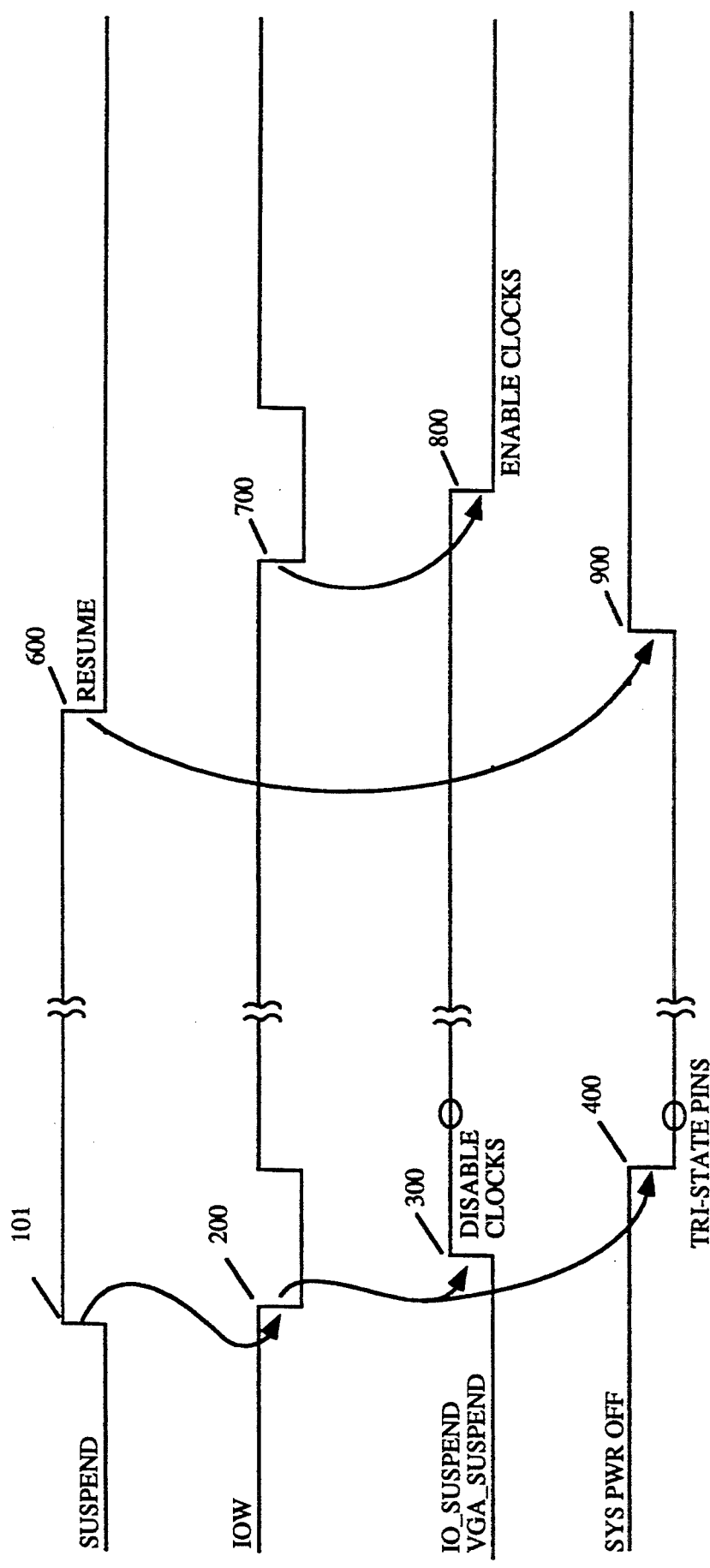
FIG. 3 is a timing diagram of the suspend and resume processes of the present invention.

The flow diagram of FIGS. 2A and 2B depicts the suspend and resume processors of the computer system. FIG. 3 is a timing diagram of the process.

In the preferred embodiment, the operation of the computer system is suspended on the occurrence of a hardware event, such as a battery low condition, the expiration of a time-out clock, or the activation of a suspend/resume button on the computer case (processing block 201). When a suspend event occurs, the I/O controller subsystem 30 is the first subsystem to be notified of the suspend request (processing block 202). This notification may occur as a result of an active SRBTN signal 100 as a result of the closure of the computer lid. The suspend notification may also occur internally to the I/O controller 30 as a result of the expiration of a timeout clock or a battery-low condition. In either case, a suspend request is activated in the I/O controller subsystem 30. This suspend request is indicated by the rising edge 101 as shown in FIG. 3.

As a result of the active suspend request, I/O controller 30 generates a power management interrupt (PMI) 92 to the CPU 20 (processing block 203). The PMI 92 is transmitted to CPU 20 as shown in FIG. 1. On receipt of the PMI, CPU 20 saves the processing state of the system (processing block 204). This save operation includes saving the contents of system registers and stack pointers in a power management memory area. Saving the state of the system allows processing to resume normally after the power suspension period has been terminated and normal power has been restored.

After CPU 20 saves the processing state, CPU 20 also issues a command to keyboard controller 55, directing keyboard controller 55 to save the state of keyboard 56 and mouse 57 and to place them in a state that allows them to be powered down (processing block 205).

CPU 20 is then vectored to an interrupt processing routine containing program logic for handling the suspend request (processing block 206). One instruction in this programming logic is a suspend IO command. Thus, after CPU 20 has saved the state of the system, CPU 20 begins to execute the program logic for handling the suspend request. As part of this sequence, CPU issues a write cycle (lOW) on bus 11 in order to set the suspend control bits IO_SUSPEND and VGA_SUSPEND to an active level (processing block 207). This lOW cycle is indicated by the falling edge 200 illustrated in FIG. 3. In an alternative embodiment, two lOW cycles may be required if the IO_SUSPEND register 31 in the I/O controller is a separate register from the VGA_SUSPEND register 41 in the VGA controller 40. In the preferred embodiment, only one lOW cycle is required to activate both suspend control bits IO_SUSPEND and VGA_SUSPEND. The activation of these control bits is depicted by the rising edge 300 depicted in FIG. 3.

Once the IO_SUSPEND and VGA_SUSPEND control bits are set by CPU 20, I/O controller 30 responds by asserting the SYS_PWR_OFF signal line 90 shown in FIG. 1 (processing block 208). The activation of SYS_PWR_OFF is shown by the falling edge 400 shown in FIG. 3. As a result of the active SYS_PWR_OFF signal, power to all peripheral devices and controllers is shut down with the exception of CPU 20, I/O controller 30, VGA controller 40, keyboard controller 55, system memory 80 and video memory 50 (processing block 209). The pins connecting the I/O controller 30, CPU 20, VGA controller 40, and keyboard controller 55 to bus 11 are set to a tri-state condition which effectively disables communication over the bus 11.

Operation During Resume Mode

The operation of the computer system 10 during the resume mode is shown in FIG. 2B. Referring to FIG. 2B, the computer system 10 is in a power suspend state as long as the SYS_PWR_OFF signal is asserted. A hardware indication may be used to signal the termination of suspend mode and the resumption of normal operations. Such a signal may be denoted as a resume signal (processing block 210). A resume signal may be provided for a variety of reasons. In the preferred embodiment, a resume signal is generated as a result of opening a cover on the computer. The opening of the computer cover causes a transition to occur on a switch operably coupled to the computer casing or the computer cover itself. In another embodiment, a resume signal can be generated as a result of a ring detect signal received by a modem connected to the computer system 10. For any of these or other conceivable reasons, the user or system event signals the computer system that resumption of normal operations is desired.

A resume signal may be provided to the I/O controller subsystem 30 (processing block 211) in the same manner that the suspend signal was provided as described above. Specifically, a suspend/resume signal line 100 is coupled to I/O controller 30. A transition on the suspend/resume signal line 100 may be used to indicate either a suspend request or a resume request. In the preferred embodiment, a suspend request is indicated by a rising edge. This transition 101 is illustrated in FIG. 3. Similarly, a resume request is indicated by a falling edge. Such a falling edge 600 is also shown in FIG. 3. It will be apparent to those skilled in the art that the direction of the signal transition is immaterial to the operation of the present invention. Equivalent embodiments of the present invention are conceivable where signals are either active high or active low.

Once I/O controller 30 receives a resume request on signal line 100, transition 600 occurs as shown in FIG. 2. When this occurs, I/O controller 30 deactivates the SYS_PWR_OFF signal supplied generally to the system 10 (processing block 212). This deactivation is depicted by edge 900 shown in FIG. 3. I/O controller 30 then enables power to all system peripherals and controllers (processing block 213). Lastly, I/O controller 30 enables communication on bus 11 by removing the tri-state condition on the pins connecting the bus 11 (processing block 214). Similarly, as a result of the deactivation of the SYS_PWR_OFF signal, VGA controller 40 enables its communication on bus 11 by removing the tri-state condition on its pins connecting the bus 11.

Upon deactivation of the SYS_PWR_OFF signal, CPU is reset and vectored to processing logic for handling the resume request (processing block 215). This processing logic restores the system state previously saved in the power management memory area (processing block 216). After CPU 20 restores its processing state, CPU 20 also issues a command to keyboard controller 55 (processing block 217). In response to the commands, keyboard controller 55 restores the states of keyboard 56 and mouse 57 (processing block 218) and places keyboard 56 and mouse 57 in the state which enables them to resume functioning within computer system 11.

The interface to the bus of CPU 20 is enabled by removing the tristate condition on the interface pins (processing block 219). CPU 20 then initiates another bus write cycle (lOW) for the purpose of resetting the IO_SUSPEND and VGA_SUSPEND control bits in the PM SUSPEND register. This lOW cycle is depicted by edge 700 in FIG. 3. The resulting reset of the IO_SUSPEND and VGA_SUSPEND bits is shown by edge 800 in FIG. 3.

The Keyboard Controller of the Present Invention

The present invention allows keyboard controller 55 to be placed into the suspended state and out of the resume state without jeopardizing the password security function of the computer system 10. In one embodiment, the keyboard controller 55 functions are performed by a separate embedded processor in a computer system. The embedded processor performs its functions according to code which is stored in on-chip memory. In one embodiment, this code is stored in an electrically programmable read-only memory (EPROM). This separate processor receives a password security command from the host processor (i.e., CPU 20) through data and command ports. When keyboard controller 55 receives a password security command, its programming code causes keyboard controller 55 to ignore all commands sent to it until the correct password is entered.

In the present invention, when computer system 10 receives a command to suspend, the states of both the keyboard and the mouse are stored so that the power can be removed. The state is then restored to them when computer system 10 resumes (i.e., exits the suspend state). However, when the keyboard/mouse controller 55 is in the password security mode, it will accept only those commands from CPU 20 which call for the saving of the keyboard and mouse states. Keyboard controller 55 is able to accept these commands from CPU 20 because of modifications made to its programming code. Thus, keyboard controller 55 will ignore any command from the processor (i.e., CPU 20) which prevents the keyboard or mouse state from being saved. In this manner, the system is prevented from shutting off the power to the keyboard and the mouse if their state could not be restored upon powering up.

The present invention allows keyboard controller 55 to save the state of the keyboard and mouse without violating the security of the system. In one embodiment, the present invention uses two commands which, in essence, tell keyboard controller 55 to save the state of the keyboard and the mouse and restore their respective states when exiting the suspended state. In the present invention, the states are saved in an internal random access memory (RAM) within the keyboard controller 35. Because keyboard controller 55 does not give any information or perform any other function than saving or restoring the state of the keyboard or mouse, the security of the system is maintained.

In the present invention, a first command performs a keyboard/mouse suspend function. This command causes keyboard controller 55 to save the state of attached keyboard 56 into an internal RAM and isolate the interface signals to attached keyboard 56, thus allowing its power to be turned off without drawing power from keyboard/mouse controller 55. Furthermore, this command saves the state of attached mouse 57 in an internal RAM and isolates its interface signals, thereby allowing it to be turned off without drawing power from keyboard/mouse controller 55. Note that in one embodiment the interface signals are isolated by tri-stating the outputs and floating the inputs without current drain.

A second command performs a keyboard/mouse resume function. This second command restores the state of attached keyboard 56 from the internal RAM and activates the interface signals to attached keyboard 56, thereby allowing keyboard/mouse controller 55 to re-establish communications with keyboard 56. The second command also restores state of the attached mouse 57 from the internal RAM and activates the interface signals to attached mouse 57, thereby allowing keyboard controller 55 to re-establish communications with mouse 57.

By allowing the states of keyboard 56 and mouse 57 states to be saved by keyboard controller 55, the present invention allows a suspend/resume function to be performed without violating this password security feature. The power to keyboard 56 and mouse 57 may be removed because their states have been saved. The keyboard controller 55 remains fully powered. Since keyboard controller 55 is responsible for the password security function, when the system powers up out of the suspended state, keyboard controller 55 remains in the password mode. Thus, keyboard controller 55 waits for the password to be entered, such that the password security function remains.

Whereas many alterations and modifications of the present invention will no doubt become apparent to a person of ordinary skill in the art after having read the foregoing description, it is to be understood that the particular embodiment shown and described by way of illustration is in no way intended to be considered limiting. Therefore, references to details of the preferred embodiment are not intended to limit the scope of the claims which in themselves recite only those features regarded as essential to the invention.

Thus, a method and apparatus for suspending and resuming a computer system has been described.

We claim:

1. In a computer system having a processor and at least one memory, an improvement for conserving power comprising:
   an input device coupled to the processor to input data and command selections to the processor;
   a controller coupled the input device to prevent command selections from being received by the processor from the input device until at least one predetermined input is received from the input device when the computer system is in a security mode;
   wherein, when in the security mode, the controller is responsive to the processor only for commands to save and restore state information of the input device, wherein the controller saves the state information of the input device in said at least one memory to allow power to the input device to be removed when the computer system enters a reduced power consumption state and restores the state information of the input device from said at least one memory after power to the input device has been restored when exiting the reduced power consumption state to ensure that the computer system returns to the security mode upon exiting the reduced power consumption state.

2. The computer system as defined in claim 1 wherein the input device comprises a keyboard.

3. The computer system as defined in claim 1 wherein the input device comprises a cursor control device.

4. The computer system as defined in claim 3 wherein the cursor control device comprises a mouse.

5. The computer system as defined in claim 1 wherein the controller saves state information of the input device in response to a first command from the processor.

6. The computer system as defined in claim 5 wherein the controller isolates at least one interface signal between the input device and the controller in response to the first command after saving state information of the input device.

7. The computer system as defined in claim 1 wherein the controller saves state information of the input device in response to a second command from the processor.

8. The computer system as defined in claim 7 wherein the controller activates at least one interface signal between the controller and the input device in response to the second command prior to restoring state information of the input device.

9. The computer system as defined in claim 1 wherein the controller comprises an on-chip memory for storing state information prior to the computer system entering the reduced power consumption state.

10. A computer system comprising:
    a processor for executing a plurality of instructions;
    a keyboard for inputting command selections to the processor, wherein the keyboard includes a keyboard state;
    a keyboard controller coupled the keyboard and the processor for receiving the command selections from the keyboard and sending the command selections to the processor, wherein the keyboard controller prevents the command selections from being received by the processor until at least one predetermined input is received from the keyboard when in a security mode;
    suspend mode generation means coupled to said processor for generating a suspend signal upon activation of a power suspend mode;
    resume mode generation means coupled to said processor for generating a resume signal upon deactivation of the power suspend mode;
    wherein, when in the security mode, the keyboard controller is responsive to the processor only for commands to save and restore state information of the input device, wherein the keyboard controller saves the state information of the keyboard to allow power to the keyboard to be removed when the computer system enters the power suspend mode and restores the state information to the keyboard after power to the keyboard has been restored when exiting the power suspend mode to ensure that the computer system returns to the security mode upon exiting the power suspend mode.

11. The computer system as defined in claim 10 wherein the keyboard controller isolates at least one interface signal between the keyboard and the keyboard controller in response to the first command after saving the state information of the keyboard.

12. The computer system as defined in claim 11 wherein the keyboard controller activates said at least one interface signal between the keyboard controller and the keyboard in response to the second command prior to restoring the state information to the keyboard.

13. A computer system comprising:
    a processor for executing a plurality of instructions;
    a keyboard for inputting command selections to the processor, wherein the keyboard includes a keyboard state;
    a cursor control device for controlling cursor movement, wherein the cursor control device includes a cursor control state;
    a keyboard controller coupled to the keyboard, the cursor control device and the processor for receiving the command selections and cursor control movement and sending the command selections and cursor control movement to the processor, wherein the keyboard controller includes means for preventing the command selections and cursor control movement from being received by the processor until at least one predetermined input is received from the keyboard when in a password security mode;
    suspend mode generation means coupled to said processor for generating a suspend signal upon activation of a power suspend mode;
    resume mode generation means coupled to said processor for generating a resume signal upon deactivation of the power suspend mode;

wherein the processor issues a first command to the keyboard controller in response to the suspend signal and a second command to the keyboard controller in response to the resume signal;

wherein, when in the password security mode, the keyboard controller receives the first command and the second command, and further wherein the keyboard controller saves the keyboard state information and the cursor control device state information in a memory in response to the first command and restores the keyboard state information and the cursor control device state information from the memory in response to the second command to ensure that the computer system returns to the password security mode when the computer system was in the password security mode upon entering the power suspend mode.

14. The computer system as defined in claim 13 wherein the keyboard controller isolates interface signals between the keyboard and the keyboard controller and between the cursor control device and the keyboard controller in response to the first command after saving the state information of the keyboard and the cursor control device respectively.

15. The computer system as defined in claim 14 wherein the keyboard controller activates said interface signal between the keyboard controller and the keyboard and between the keyboard controller and the cursor control device in response to the second command prior to restoring state information of the keyboard and the cursor control device respectively.

* * * * *